United States Patent [19]

Mouza

[11] 4,326,610
[45] Apr. 27, 1982

[54] PROTECTIVE SHIELD DEVICE FOR BRAKE

[75] Inventor: Jean-Claude Mouza, Courbevoie, France

[73] Assignee: Societe Anonyme Francaise du Ferodo, Paris, France

[21] Appl. No.: 131,104

[22] Filed: Mar. 18, 1980

[30] Foreign Application Priority Data

Mar. 23, 1979 [FR] France .................. 79 07395

[51] Int. Cl.³ .................................... F16D 65/847
[52] U.S. Cl. ........................... 188/218 A; 188/71.6; 188/264 AA
[58] Field of Search ............... 188/71.6, 76, 218 A, 188/264 AA

[56] References Cited

U.S. PATENT DOCUMENTS 3,142,364 7/1964 Mikkelson ............... 188/218 A X
4,005,768 2/1977 Bubnash et al. .............. 188/218 A
4,207,971 6/1980 Ishikawa et al. ........... 188/218 A X Primary Examiner—Duane A. Reger
Attorney, Agent, or Firm—Charles E. Brown

[57] ABSTRACT

The invention provides a protective shield device for a brake having a rotating braking element in the form of a ring or drum. The shield comprises a plate which extends opposite the face of at least a part of the rotating element of the brake, and a sheet part which extends the plate by running out from the plane of the latter to penetrate into the internal space of the rotating element in the immediate vicinity thereof. This provides an ejector for the brake which prevents solid particles such as grit entering the brake parts.

The invention is particularly applicable to brakes designed for use in motor vehicles.

16 Claims, 4 Drawing Figures

PROTECTIVE SHIELD DEVICE FOR BRAKE

BACKGROUND OF THE INVENTION

The present invention generally relates to ring or drum brakes, i.e. brakes in which the rotating element to be braked is an annular drum or ring having axially-extending surfaces, the brake shoes being applied against the internal surfaces of the drum (drum brake) or against both the internal and external surfaces of the drum (ring brake).

Such brakes are most commonly utilised in motor vehicles.

The rotating element is usually carried by a transverse wheel disc by means of which it is adapted to be fixed to the shaft of the wheel to be braked, and the space delimited by the element and this wheel disc is normally open to the outside.

In order to limit the access to this space of contaminants such as road dirt which are capable of impairing the proper operation of the brake, or to prevent access of more damaging contaminants such as loose chippings, it has already been proposed to equip drum brakes, that is to say brakes in which the braking surface is formed only on the inner surface of the rotating braking element, with a protective shield which extends opposite the face of at least a part of this rotating element.

Such a shield is described for example in French Pat. No. 1,524,263 (U.S. Pat. No. 3,481,433), U.S. Pat. No. 2,284,357 and French Pat. Nos. 2,172,516 (U.S. Pat. No. 3,853,207) and 1,524,137 (U.S. Pat. No. 3,481,433).

In French Pat. No. 1,524,263, the protective shield forms a plate and more precisely a closing wall which extends over the whole of the rotating drum-like element.

This affects the normal ventilation of the internal space in the brake, and contaminants entering this space, for example when the vehicle concerned is traversing muddy terrain, can only escape from it with difficulty.

Similar observations can be made with regard to the shields disclosed in U.S. Pat. No. 2,284,357 and French Pat. Nos. 1,524,137 and 2,172,516, even if the protective plate of these devices presents a portion which, spaced away from the general level of the plate, projects into the internal space defined by the rotating element, the protection devices described therein essentially constitute closing walls designed to prevent the ingress of all contaminants into the internal space, to the prejudice of the ventilation of the latter.

The primary object of the present invention is to provide a protective shield for ring or drum brakes which is free from the above disadvantages and which in addition presents other advantages.

A further object of the invention is to provide a ring or drum brake which is fitted with such a protective shield.

SUMMARY

The protective shield device according to the invention, which is designed for use in a brake the rotating braking element of which has generally the shape of a ring or drum, is of the kind comprising a first part which forms a plate which is suitable to extend opposite the face of at least a part of the rotating element, and a second part which runs out from the plane of the said plate and penetrates the internal space defined by the rotating element, and the outermost radial periphery of which has a circular contour with a diameter close to the internal diameter of the said rotating element; the device is particularly characterised in that the said second part comprises a sheet.

Apart from the protection provided by the plate itself, such a device assumes advantageously, by means of the sheet according to the invention, a double function, as follows:

On the other hand, since it is arranged in the immediate vicinity of the internal surface of the rotating element of the brake concerned, the sheet operates as an ejector for the brake and thus prevents any significant contaminants, which have entered the internal space of the rotating element, from becoming attached to the rotating element or from becoming jammed between it and the other parts of the brake; on the other hand, the sheet ensures that the air in the internal space of the rotating element is made considerably turbulent so that the ventilation of the rotating element and of the wheel disc carrying it is improved. In particular, this agitation of the air destroys the boundary layer of air in contact with the rotating element and the wheel disc and greatly improves cooling of the assembly.

According to a development of the invention, at least one part of the sheet comprising the protective device according to the invention, for example a depending edge of the latter, is located in the immediate vicinity of the wheel disc carrying the rotating element in order to further improve the ventilation of the disc.

In accordance with another particular embodiment, the protective shield device according to the invention, which is preferably of one piece but which can be constructed of at least two separate parts, incorporates a grid or array of perforations.

The results of this is that its weight is reduced and the ventilation of the internal space of the rotating braking element is improved.

The protective shield device according to the invention, while ensuring an efficient protection of the brake concerned, thus not only does not impede proper cooling of the parts of the brake during operation but actually improves this cooling.

In addition, fitting of the device is simple and economical: it may consist of a simple piece of sheet metal or similar material, suitably cut and shaped, or of several of such pieces.

DESCRIPTION OF THE PREFERRED EMBODIMENT

Figure 1:
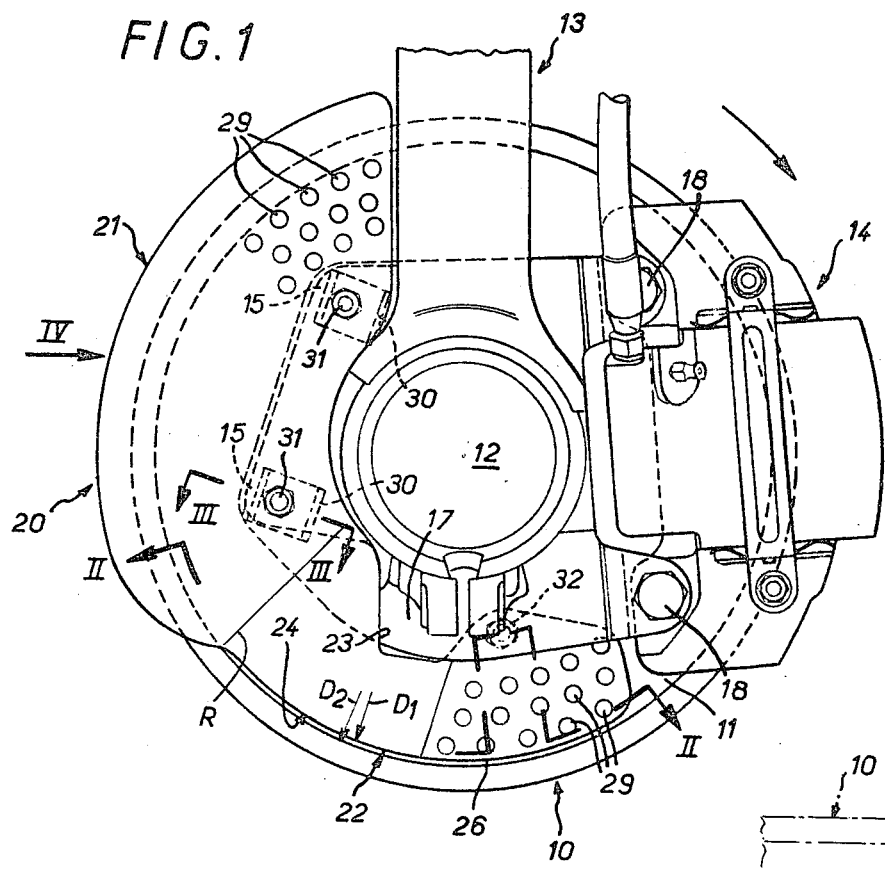
FIG. 1 shows an elevation of a ring brake provided with a protective shield according to the invention.

FIG. 1 shows a ring brake, that is to say a brake having an annular rotating braking element 10 which has the shape of a ring or drum.

Such a brake is well known in itself and will, therefore not be described here in detail.

It is sufficient to recall that such a ring 10 is usually carried by a transverse wheel disc 11 by means of which it is fixed to the shaft 12 of the wheel to be braked, and that on the stub axle 13 of this wheel shaft a caliper 14 is mounted which has the function of applying during braking the brake shoes to both internal and external surfaces of the ring 10 so as to clamp the ring 10 between them.

Figure 3:
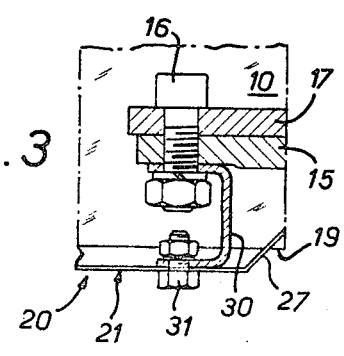
FIG. 3 shows another partial view along line III—III in FIG. 1.

In the embodiment shown, the stub axle 13 has two lugs 15 which are used to add to it, by means of bolts 16 in FIG. 3, a flange 17 on which latter the caliper 14 is mounted by means of the bolts 18, the flange 17 thus forming an intermediate support between this caliper 14 and the stub axle 13.

The brake constructed in this manner is provided with a protective shield 20.

This protective shield 20 is composed of two parts, as follows; the first part forms a plate 21 which extends opposite the face of at least a part of the ring 10, at a slight distance from the latter; in the embodiment shown, the plate 21 projects slightly past the outer periphery of the ring in order to allow the hot air from the inside of this ring to escape.

In practice, in the embodiment shown, the plate 21, which is strictly flat, extends circularly over only a little more than a quarter of the circumference of the ring 10 on the side of the ring diametrically opposed to the caliper 14.

According to the invention, the second part of the protective shield 20 is comprised of a sheet 22 which circularly extends the plate 21 by running out from the plane of the latter to penetrate into the internal space within the ring 10, in the direction of the caliper 14 and into the vicinity of the latter.

In the embodiment shown, the sheet 22 extends circularly over only a little less than a quarter of the circumference of the ring 10. It is connected to the plate 21 along a root-line R which extends generally radially, and due to this root-line R the sheet 22 itself extends generally circumferentially in the manner of a helix.

The innermost radial periphery of the sheet 22 is adapted to clear the elements located inside the space of the ring 10; thus in the embodiment shown it comprises an indentation 23 so that it can be joined to the flange 17.

According to one characteristic of the invention, its outermost radial periphery, designated by general reference 24 in FIG. 1, has a circular contour with a diameter D1 next to the internal diameter D2 of ring 10.

The outermost radial periphery 24 of the sheet 22 is of a single piece: the sheet 22, of which it consists, is continuously connected to the plate 21, its root-line R being a folding line.

In practice, in the embodiment shown, the sheet 22 comprises an end section 26 which is generally flat and which extends parallel to the plate 21 in the vicinity of the wheel disc 11 carrying the ring 10, and a connecting section 27 which is generally curved and the concave side of which faces the outside and which continuously links the plate 21 with the preceding end section 26, with the purpose of ejecting contaminants.

In addition, the protective shield 20 is formed over its whole extent, including plate 21 and sheet 22, with a regular array of perforations 29, except on the part of the plate 21 which is opposite the ring 10 and outside of the latter.

These perforations are too small to allow significant contaminants to enter into the internal space of the ring 10, but allow the latter to be ventilated.

Figure 2:
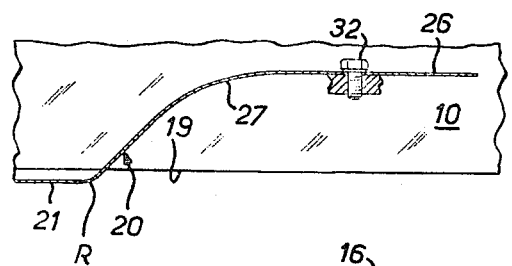
FIG. 2 shows a partial circumferential section, projected onto a level plane, of this brake along line II—II in FIG. 1.

In the embodiment shown, the protective shield 20 is attached to the flange 17, which forms the support for the caliper 14, in the following manner: two U-shaped brackets 30 are mounted on the assembly comprised of the flange 17 and the lugs 15 of the stub axle 13, by means of the same bolts 16 which ensure that this flange 17 is fixed to the said lugs, and the plate 21 is fixed to these brackets 30 by means of the bolts 31 on the side of the sheet 22 which is directly fixed to the flange 17 by means of a bolt 32, as shown in FIGS. 1 and 2.

Figure 4:
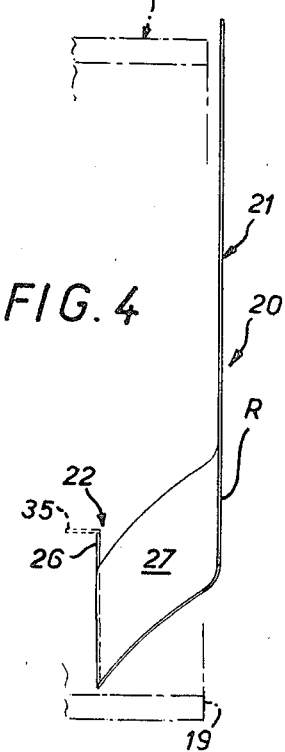
FIG. 4 shows a lateral view of a single protective shield of this brake, shown in isolation, looking in the direction of arrow IV in FIG. 1.

According to an embodiment, shown in broken lines in FIG. 4, the end section 26 of the sheet 22 of the protective shield according to the invention comprises at its end a depending edge 35 which extends in the direction of the wheel disc 11 and into the vicinity of the latter.

In the same way, several similar tabs may be provided within the same contour of this end section for better agitation of the air.

In brief and more generally, at least one part of the sheet 22 extends in this case into the immediate vicinity of the wheel disc 11, projecting from the sheet 22 in the opposite direction to the plate 21.

The present invention is not limited to the forms of embodiment described and shown but encompasses all variants within the scope of the appended claims. In particular, instead of being in one single piece, the protective shield 20 according to the invention can be formed from at least two separate parts, for example with the plate as one part and the sheet as the other part, suitably assembled or individually mounted on the support of the brake concerned.

Furthermore, instead of being fixed to such a support, it can be unitary with any other fixed element.

The plate 21 of the shield can also extend on a more or less extended part of the circumference of the ring 10 and/or encompass the latter to a greater or lesser extent; similarly, the sheet 22 can extend on a more or less extended part of the circumference of the ring 10.

According to the geometry of the whole brake concerned, and so that the sheet 22 can be adapted to this geometry, this sheet 22 and particularly its end section can be cut into several tongues.

As a variant, this sheet can be reduced at its curved section.

According to another variant, such a sheet can be transversely inclined in the manner of a plough-share.

Furthermore, several sheets may be provided.

The perforations contained in the protection device according to the invention can also each be provided with a hood, for example in the form of louvres, and produced, for example, by punching, and such a hood is preferably oriented in such a manner that it ensures maximum protection with respect to projectiles originating from the outside.

Finally, the application of the invention is not limited to the ring brakes more particularly considered above but also extends to drum brakes.

I claim:

1. A protective shield device for a brake of the type including a hollow cylindrical rotating braking element fixed for rotation with a transverse end member, said shield device being a part annular configuration, said shield device comprising a plate part extending along a first limited circumferential region opposite the transverse end member, and a general helical sheet part extending from the first limited circumferential region of said plate part to a second limited circumferential region which penetrates deeply into an internal space of the rotating element toward the transverse end member, said helical sheet portion having a radial outer edge which is part circular and lies immediately adjacent an inner cylindrical wall of the rotating element, and said helical sheet part having means for ejecting foreign matter which may enter the internal space of the rotating element.

2. A protective shield device for a brake of the type including a braking element having a hollow cylindrical rotating element fixed for rotation with a transverse end member, said shield device being of part annular configuration and comprising a plate part extending along a first limited circumferential region opposite said transverse end member, and a generally helical sheet part extending from the first limited circumferential region of said plate part to a second limited circumferential region and penetrating deeply into an internal space of the rotating element toward the transverse end member, a radial outer edge of said helical sheet part being part circular and lying immediately adjacent an inner cylindrical wall of the rotating element, said helical sheet part having means for producing air turbulence in the internal space of the rotating member.

3. A protective shield device according to claim 1 or 2, wherein said helical sheet part is connected to said plate part along a generally radial root line.

4. A protective shield device according to claim 1 or 2, wherein said helical sheet part having a curved section continuously connected to said plate part.

5. A protective shield device according to claim 1 or 2, said helical sheet part being generally at right angles to the axis of rotation of the rotating element, wherein said helical sheet part comprises an end section remote from said plate part and parallel thereto.

6. A protective shield device according to claim 1 or 2, wherein said helical sheet part comprises a depending part extending in a direction axially away from said plate part.

7. A protective shield device according to claim 1 or 2, further comprising an array of perforations in said shield device.

8. A protective shield device according to claim 1 or 2, wherein said plate part extends over only a little more than a quarter of the circumference of the rotating element at the first limited circumferential region.

9. A prospective shield device according to claim 1 or 2, wherein said helical sheet part extends over only a little less than a quarter of the circumference of the rotating element at the second limited circumferential region.

10. A brake of the kind comprising a hollow cylindrical rotating braking element fixed for rotation with a transverse end member, and a protective shield device of part annular configuration, said shield device, comprising a first part extending along a limited circumferential extent opposite said transverse end member, and a generally helical second part extending over a limited circumferential extent from said first part into an internal space of said rotating element toward said transverse end member, a radial outer edge of said helical second part being part circular and lying immediately inside an inner cylindrical wall of said rotating element, said helical second part defining means for ejecting foreign matter which may enter said internal space of said rotating element.

11. A brake according to claim 10, said helical second part having a free end disposed immediately adjacent said transverse end member.

12. A brake according to claim 10, wherein said helical second part comprises a depending part extending in a direction axially away from said first part.

13. A brake according to claim 10, wherein said helical second part comprises a tab extending in a direction axially away from said first part.

14. A brake according to claim 10, wherein said first part projects radially outwardly beyond the periphery of said rotating element.

15. A brake according to claim 10, wherein said protective shield is of one-piece construction.

16. A brake according to claim 10, wherein said two parts are separate.

* * * * *